Oct. 2, 1923.

1,469,648

W. S. SHUPE

HEATER

Filed Jan. 8, 1923

INVENTOR.
William S. Shupe.
BY
Geo. P. Kimmel   ATTORNEY.

Patented Oct. 2, 1923.

1,469,648

UNITED STATES PATENT OFFICE.

WILLIAM S. SHUPE, OF PHILADELPHIA, PENNSYLVANIA.

HEATER.

Application filed January 8, 1923. Serial No. 611,358.

*To all whom it may concern:*

Be it known that I, WILLIAM S. SHUPE, a citizen of the United States, residing at Philadelphia, in the county of Philadelphia and State of Pennsylvania, have invented certain new and useful Improvements in Heaters, of which the following is a specification.

This invention has reference to heaters and is intended particularly for use in furnaces of the hot air or hot water or pipeless types of furnaces, using gas as a fuel.

The heater comprises a two section casing, having a baffle plate interposed between the sections and extending outwardly and downwardly to form an annular flange, the upper casing section being provided with peripheral openings and surmounted by a cone-shaped dome, the edge of which extends beyond the casing forming a spreader for the flames and heat. A suitable burner is positioned in the lower section, which burner is connected to a suitable source of gas supply.

The invention will be best understood from a consideration of the following detailed description taken in connection with the accompanying drawings, forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1:
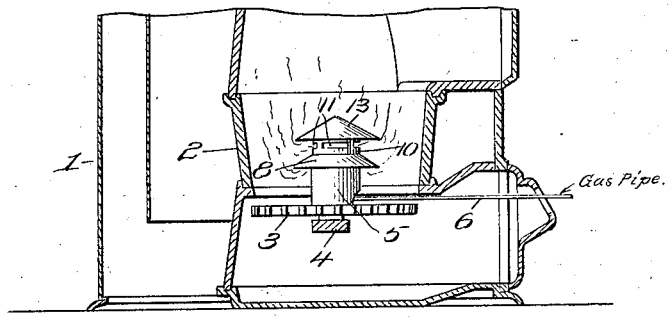
Figure 1 is a transverse vertical section of a portion of a furnace of any desired type provided with the invention.
Figure 2:
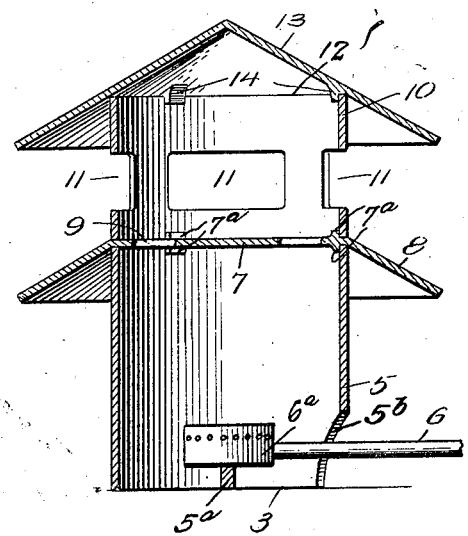
Fig. 2 is a vertical central section of the heating element embodying the invention.
Figure 3:
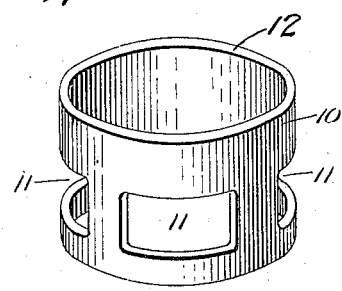
Fig. 3 is a perspective view of one element of the heating section.
Figure 4:
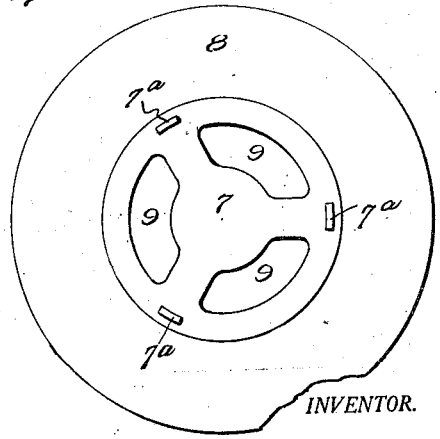
Fig. 4 is a top plan view of the heating element.

Referring to the drawings, there is shown a typical form of furnace 1 designed particularly for the employment of hot air as a heating element.

The furnace is provided with a fire box 2 furnished with a grate 3 having thereebeneath a grate bar 4 said grate supporting a burner casing 5 and the burner casing 5 may be taken as typical of a heating structure useful for a hot air furnace or a hot water furnace, or a pipeless furnace.

Entering the burner casing 5, which is generally indicated as a shell of cylindrical form, through an arcuate opening $5^b$ in the lower edge of the casing, is a pipe 6, leading to a burner $6^a$ supported therein on a crossbar $5^a$ and assumed to come from a suitable source of supply of gas, particularly illuminating gas.

The burner casing 5 terminates in a transverse baffle plate 7 higher than the burner and resting on top of the casing 5. The baffle plate 7 terminates about the edges in a downturned flange 8 outside of the cylinder 5 so as to deflect the heat radiated from the burner casing toward the edges of the flange 8, while perforations or passages 9 through the plate or diaphragm 7 permit an escape of the heat within the cylinder 5 above the plate 7.

Supported upon the plate 7, carried by the cylinder 5, there is mounted a second cylinder 10 which may be of the same diameter as the cylinder 5 and rises thereabove and is provided about its periphery with a series of openings or passages 11 circumferentially thereof.

The cylinder 10 terminates in a plain upper end 12 constituting a support for a conical roof or crown 13, spreading similarly to the marginal portion 8 of the plate 7 and overhanging and about parallel thereto.

The plate 7 is provided upon its upper and lower surface, with lugs $7^a$ which assist in keeping the same correctly positioned between the upper and lower cylinders.

The crown 13 is provided with a circular series of shoulders 14 constituting supports for the crown 13 on the upper end of the sleeve 10.

When it is desired to use the furnace for heating purposes, the gas burner within the casing 5 is lighted and the flames so produced will pass up to and through the plate 7 by way of the passages 9, these passages allowing a portion of the flames, spread by the baffle plate 7, to pass into the cylinder 10 and part of them being directed along the under surface of the plate 7 against the wall of the cylinder 5, the heat radiating from the outer surface against the under walls of the flange 8 causing an active diffusion of the heat to the exterior of the burner casing 5 and at the same time the passage of the hot products of combustion through the openings 11 to the exterior of the casing 10 and into contact with the under face of the crown 13.

What is claimed is:—

1. In a heater of the character described, a pair of apertured casings one arranged above and in alignment with the other, a burner located within the lower of said casings, an apertured heat deflecting plate interposed between said casings and having a downturned annular flange extending beyond the casing, and a conical crown overlying the upper casing and outstanding therefrom.

2. In a heater for furnaces or the like, a pair of apertured cylindrical casings one arranged above and in alignment with the other, a bar extending transversely of the lower casing at the bottom thereof, a gas burner positioned within the lower casing upon said bar, an apertured heat deflecting plate interposed between said casings, lugs carried upon each side of said plate for retaining the same in position between said casings, a conical crown upon the top of and covering the upper casing, and lugs carried by said crown upon its under side for retaining the same in position.

3. In a heater for lodgement within the firebox of a furnace, a pair of casings, one arranged above and in alignment with the other, the lower casing being of greater length than the upper and provided with an arcuate shaped opening extending upward from its lower edge, the upper casing being provided with a series of peripheral openings, a bar member extending transversely of the lower casing at the bottom thereof, a gas burner positioned within the lower casing upon said bar, means for supplying gas to said burner, an apertured heat deflecting plate interposed between said casings having a downturned annular flange extending beyond said casing and a conical crown overlying the upper casing and outstanding therefrom.

In testimony whereof, I affix my signature hereto.

WILLIAM S. SHUPE.